(12) United States Patent
Chen et al.

(10) Patent No.: US 12,442,036 B2
(45) Date of Patent: Oct. 14, 2025

(54) MULTIPLEX ASSAY FOR NUCLEIC ACID DETECTION

(71) Applicant: Microsoft Technology Licensing, LLC, Redmond, WA (US)

(72) Inventors: Yuan-Jyue Chen, Seattle, WA (US); Karin Strauss, Seattle, WA (US); Bichlien H Nguyen, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 943 days.

(21) Appl. No.: 17/456,855

(22) Filed: Nov. 29, 2021

(65) Prior Publication Data

US 2023/0167485 A1   Jun. 1, 2023

(51) Int. Cl.
| | |
|---|---|
| *C12Q 1/6816* | (2018.01) |
| *C12N 9/22* | (2006.01) |
| *C12N 15/11* | (2006.01) |

(52) U.S. Cl.
CPC ............ *C12Q 1/6816* (2013.01); *C12N 15/11* (2013.01); *C12N 9/222* (2025.05)

(58) Field of Classification Search
CPC .. C12Q 1/6816; C12Q 1/6811; C12Q 1/6813; C12Q 2521/327; C12Q 2525/125; C12Q 2537/143; C12Q 2537/149; C12Q 2563/107; C12Q 2565/101; C12Q 2521/301
See application file for complete search history.

(56) References Cited

U.S. PATENT DOCUMENTS

2008/0309701 A1*  12/2008  Pierik et al. ........... B41J 29/393
                                                      347/19

FOREIGN PATENT DOCUMENTS

| EP | 3872171 A1 * | 9/2021 | ............ C12N 15/11 |
|---|---|---|---|
| WO | 2020102610 A1 | 5/2020 | |
| WO | 2021188830 A2 | 9/2021 | |

(Continued)

OTHER PUBLICATIONS

Broughton et al., CRISPR-Cas 12-based detection of SARS-CoV-2. Nat Biotech 38: 870-874, Apr. 2020 (Year: 2020).*

(Continued)

*Primary Examiner* — Anne M. Gussow
*Assistant Examiner* — Emma R Hoppe
(74) *Attorney, Agent, or Firm* — Alleman Hall & Tuttle LLP

(57) ABSTRACT

A multiplex assay for nucleic acid detection includes a substrate, a sample, and a fluorophore-labeled oligonucleotide. The substrate has a plurality of physically separated assay locations, each of which includes a nucleotide-targeting enzyme configured to cleave nucleic acids, a guide ribonucleic acid (gRNA), and a quencher-labeled oligonucleotide. A portion of the sample is distributed to each assay location. The gRNA recognizes target nucleic acid in the sample, thereby activating the nucleotide-targeting enzyme to cleave nucleic acids, including the quencher-labeled oligonucleotide. The fluorophore-labeled oligonucleotide is subsequently added to each assay location, which facilitates identification of a presence of the target nucleic acid in the sample via detection of unquenched light emitted by the fluorophore in one or more of the plurality of assay locations.

20 Claims, 6 Drawing Sheets

(56) References Cited

FOREIGN PATENT DOCUMENTS

| WO | 2022019893 | A1 | | 1/2022 | |
|----|------------|-----|---|--------|---|
| WO | WO2023278629 | A1 | * | 6/2022 | ............ C12Q 1/6827 |

OTHER PUBLICATIONS

Seamon et al., Versatile High-Throughput Fluorescence Assay for Monitoring Cas9 Activity. Anal Chem 90: 6913-6921, May 2018 (Year: 2018).*

Myhrvold et al., Field Deployable Viral Diagnosis Using CRISPR-Cas13. Science 360: 444-448, Apr. 2018 (Year: 2018).*

Berk et al., Versatile High-Throughput Fluorescence Assay for Monitoring Cas9 Activity. Anal Chem 90: 6913-6921, May 2018 (Year: 2018).*

Milenia GenLine HybriDetect 2T [Internet]. Milenia-Biotec. Accessed Oct. 24, 2024. Available from: https://www.milenia-biotec.com/uploads/2019/07/MGHD2_C.pdf (Year: 2024).*

3' Biotin [Internet]. IDT. Accessed Oct. 23, 2024. Available from: https://www.idtdna.com/site/catalog/modifications/product/1065 (Year: 2024).*

Custom DNA oligos [Internet]. IDT. Accessed Oct. 24, 2024. Available from: https://www.idtdna.com/pages/products/custom-dna-rna/dna-oligos/custom-dna-oligos (Year: 2024).*

Gootenberg JS, et al. Multiplexed and portable nucleic acid detection platform with Cas13, Cas12a, and Csm6. Science. Apr. 27, 2018;360(6387):439-444. Epub Feb. 15, 2018. (Year: 2018).*

Mukama O, et al. An ultrasensitive and specific point-of-care CRISPR/Cas12 based lateral flow biosensor for the rapid detection of nucleic acids. Biosens Bioelectron. Jul. 1, 2020;159:112143. Epub Mar. 1, 20204 (Year: 2020).*

Berk, et al., "Rapid Visual Authentication Based on DNA Strand Displacement", in Journal of ACS Applied Materials & Interfaces, vol. 13, Issue 16, Apr. 14, 2021, pp. 19476-19486.

Wang, et al., "Paper-Based DNA Reader for Visualized Quantification of Soil-Transmitted Helminth Infections", in Journal of ACS Sensors, vol. 3, Issue 1, Jan. 26, 2018, pp. 205-210.

"International Search Report and Written Opinion Issued in PCT Application No. PCT/US22/048642", Mailed Date: Feb. 27, 2023, 12 Pages.

Zavvar, et al., "CRISPR/Cas-engineered technology: Innovative approach for biosensor development", in journal of Biosensors and Bioelectronics, vol. 214, Oct. 15, 2022, 15 Pages.

* cited by examiner

MULTIPLEX ASSAY FOR NUCLEIC ACID DETECTION

BACKGROUND

Multiplex assays provide simultaneous detection and/or measurement of one or more target analytes under multiple conditions in a single assay. As such, multiplex assays are often used in high throughput screening techniques. Having high levels of sensitivity, multiplex assays are an important diagnostic tool for detecting and differentiating nucleic acid taggants, microorganisms, and other components in samples, such as swabs from commercial goods and currency or specimens collected from humans or agricultural environments.

SUMMARY

To address the issues discussed herein, a multiplex assay for nucleic acid detection is provided. According to one aspect, the multiplex assay may include a substrate having a plurality of physically separated assay locations and a sample, a portion of which may be distributed to each assay location of the plurality of assay locations. Each assay location of the plurality of assay locations may include a nucleotide-targeting enzyme that cleaves nucleic acids, a guide ribonucleic acid (gRNA), and a quencher-labeled oligonucleotide. The gRNA forms a complex with the nucleotide-targeting enzyme. A sequence of the gRNA may be complementary to a sequence of a target nucleic acid. The quencher-labeled oligonucleotide may have an anchor portion configured to bind to the substrate, and a quencher configured to absorb energy emitted by an adjacent fluorophore. The gRNA may be configured to recognize the target nucleic acid in the sample, thereby guiding the nucleotide-targeting enzyme to the target nucleic acid and activating the nucleotide-targeting enzyme to cleave nucleic acids, including the quencher-labeled oligonucleotide. The assay may further include a fluorophore-labeled oligonucleotide that is added to each assay location of the plurality of assay locations subsequent to a distribution of the sample. The fluorophore-labeled oligonucleotide may have a sequence at least partly complementary to a sequence of the quencher-labeled oligonucleotide, and a fluorophore configured to emit light upon excitation in the absence of the quencher. With the described configuration, a user can identify a presence of the target nucleic acid in the sample via detection of unquenched light emitted by the fluorophore in one or more assay locations of the plurality of assay locations.

According to another aspect, a method for manufacturing a multiplex assay for nucleic acid detection is provided. The method may include preparing a substrate with a plurality of physically separated assay locations. The method may further include synthesizing a guide ribonucleic acid (gRNA) to have a sequence complementary to a sequence of a target nucleic acid. The method may further include purifying a nucleotide-targeting enzyme that cleaves nucleic acids. The method may further include synthesizing a quencher-labeled oligonucleotide. The quencher-labeled oligonucleotide may have an anchor portion configured to bind to the substrate and a quencher configured to absorb energy emitted by an adjacent fluorophore. The method may further include adding the gRNA, nucleotide-targeting enzyme complex, and quencher-labeled oligonucleotide to each assay location of the plurality of assay locations. The method may further include synthesizing a fluorophore-labeled oligonucleotide to be added to each assay location of the plurality of assay locations subsequent to addition of a sample. The fluorophore-labeled oligonucleotide may have a sequence at least partly complementary to a sequence of the quencher-labeled oligonucleotide, and a fluorophore configured to emit light upon excitation in the absence of the quencher. The gRNA may be configured to recognize the target nucleic acid in a sample that is distributed to each assay location of the plurality of assay locations, thereby guiding the nucleotide-targeting enzyme to the target nucleic acid and activating the nucleotide-targeting enzyme to cleave nucleic acids, including the quencher-labeled oligonucleotide. Upon subsequent addition of the fluorophore-labeled oligonucleotide to each assay location of the plurality of assay locations, a user may determine a presence of the target nucleic acid in the sample via detection of unquenched light emitted by the fluorophore in one or more of the plurality of assay locations.

According to another aspect, a multiplex assay is provided. The multiplex assay may include a nitrocellulose membrane and a sample. The nitrocellulose membrane may have a plurality of physically separated assay locations achieved via depositing a pattern of hydrophobic barriers on the nitrocellulose membrane with a wax-based printer. A portion of the sample may be distributed to each assay location of the plurality of assay locations. Each assay location of the plurality of assay locations may include a nucleotide-targeting enzyme that cleaves nucleic acids, a guide ribonucleic acid (gRNA), and a quencher-labeled oligonucleotide, which may be deposited on the nitrocellulose membrane with an ink-jet printer to allow the multiplex assay to be stored for later use prior to a distribution of the sample. The gRNA forms a complex with the nucleotide-targeting enzyme. A sequence of the gRNA may be complementary to a sequence of a target nucleic acid. The quencher-labeled oligonucleotide may have an anchor portion configured to bind to the nitrocellulose membrane, and a quencher configured to absorb energy emitted by an adjacent fluorophore. Upon distribution of the sample to each assay location of the plurality of assay locations, the gRNA may be configured to recognize the target nucleic acid in the sample, thereby guiding the nucleotide-targeting enzyme to the target nucleic acid and activating the nucleotide-targeting enzyme to cleave nucleic acids, including the quencher-labeled oligonucleotide. The assay may further include a fluorophore-labeled oligonucleotide that is added to each assay location of the plurality of assay locations subsequent to a distribution of the sample. The fluorophore-labeled oligonucleotide may have a sequence at least partly complementary to a sequence of the quencher-labeled oligonucleotide, and a fluorophore configured to emit light upon excitation in the absence of the quencher. With the described configuration, a user can identify a presence of the target nucleic acid in the sample via detection of unquenched light emitted by the fluorophore in one or more of the plurality of assay locations.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Several significant challenges exist in achieving rapid, accurate results when testing for the presence of a variety of analytes in a single assay, particularly for on-site implementations. A stable multiplex assay that can be used to test samples for multiple analytes without requiring preparation of the assay immediately beforehand would improve the efficiency of conducting such an analysis and negate the need for performing several individual assays. Additionally, a multiplex assay that is designed to detect nucleic acids without the need for amplification would greatly simplify sample preparation and reduce the time needed to perform the analysis. Further, in combination with the above features, the ability to detect results of the assay quickly and easily with a hand-held light device would enable a user to perform the assay from start to finish at the site of sample collection. A multiplex assay having these characteristics would offer the ability to quickly and accurately detect and/or quantify the presence of multiple analytes at one time without the requirement for large equipment and laboratory space. However, heretofore challenges have existed for the development of such an assay.

Figure 1:
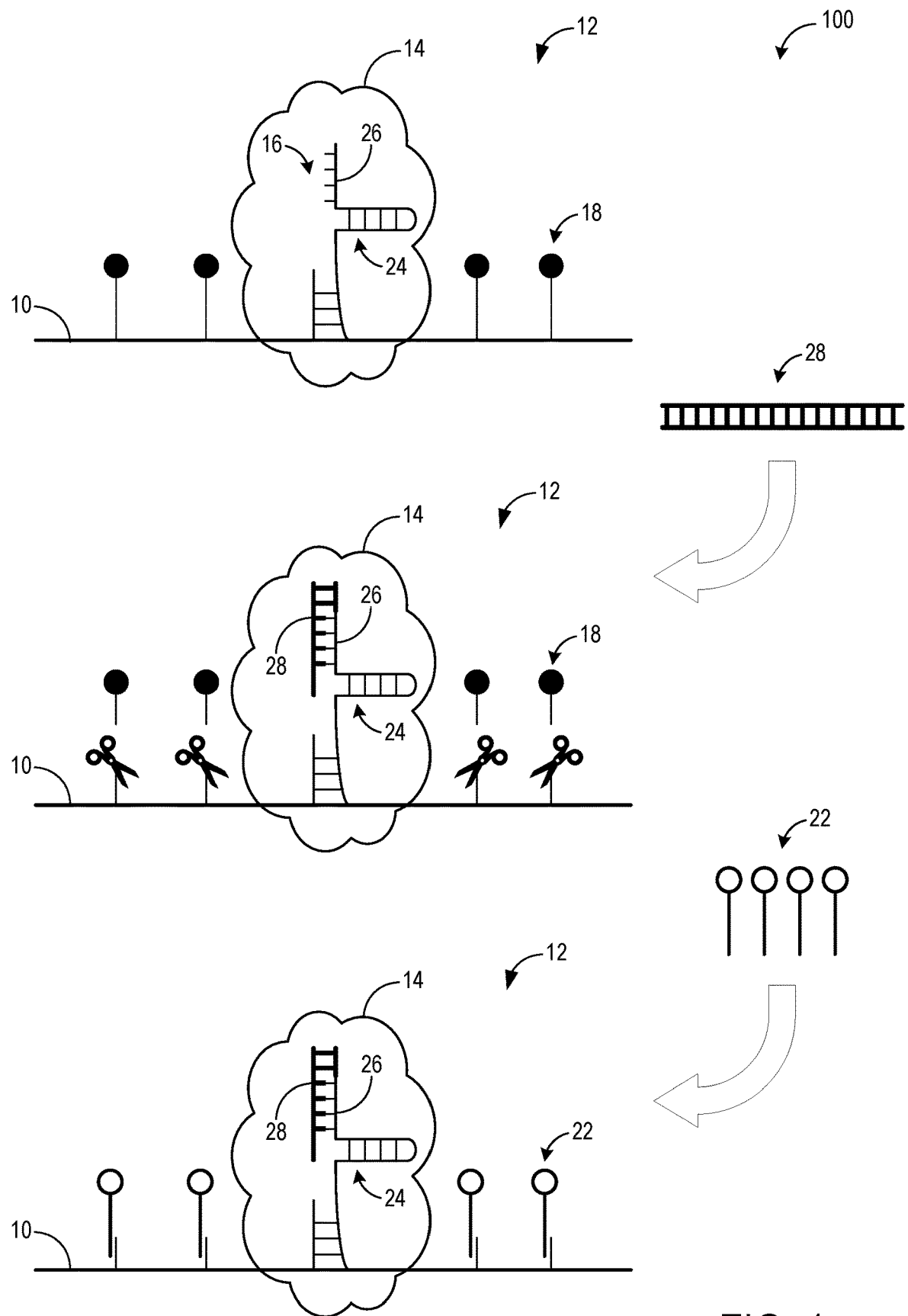
FIG. 1 is an illustration of a multiplex assay for nucleic acid detection.

As illustrated in FIG. 1, to address the above identified issues, a multiplex assay 100 for nucleic acid detection is provided. The assay 100 includes a substrate 10. As described below with reference to FIGS. 3A and 3B, the substrate 10 may have a plurality of physically separated assay locations 12. Each assay location 12 of the plurality of assay locations includes a nucleotide-targeting enzyme 14, a guide ribonucleic acid (gRNA) 16, and a quencher-labeled oligonucleotide 18. The assay 100 further includes a sample 20, a portion of which is distributed to each assay location 12 of the plurality of assay locations. A fluorophore-labeled oligonucleotide 22 is added to each assay location 12 of the plurality of assay locations subsequent to a distribution of the sample 20.

The nucleotide-targeting enzyme 14 has enzymatic activity for cleaving nucleic acids. The gRNA 16 includes a scaffold sequence 24 configured to bind the nucleotide-targeting enzyme 14, thereby forming a complex with the nucleotide-targeting enzyme 14, and a spacer sequence 26 that is complementary to a sequence of a target nucleic acid 28. As such, the gRNA 16 is configured to recognize the target nucleic acid 28 in the sample 20 and guide the nucleotide-targeting enzyme 14 to the target nucleic acid 28. The scaffold sequence 24 is at the 3' end of the gRNA 16, and the spacer sequence 26 is at the 5' end of the gRNA 16. It will be appreciated that the spacer sequence 26 is preferably at least 17 nucleotides long, and more preferably 20 nucleotides to 30 nucleotides long. When the spacer sequence 26 of the gRNA 16 binds the complementary sequence of the target nucleic acid 28, the nucleotide-targeting enzyme 14 is activated to cleave nucleic acids, including the quencher-labeled oligonucleotide 18.

As described in detail below with reference to FIGS. 2A to 2C, the quencher-labeled oligonucleotide 18 may have an anchor portion 30 configured to bind to the substrate 10, and a quencher 32 configured to absorb energy emitted by an adjacent fluorophore. The fluorophore-labeled oligonucleotide 22 may have a sequence 34 at least partly complementary to a sequence of the quencher-labeled oligonucleotide 18, and a fluorophore 36 configured to emit light upon excitation in the absence of the quencher 32. As such, a user can identify a presence of the target nucleic acid 28 in the sample 20 via detection of unquenched light emitted by the fluorophore 36 at one or more assay locations 12 of the plurality of assay locations.

The nucleotide-targeting enzyme 14 may be, for example, a clustered regularly interspaced short palindromic repeats (CRISPR)-associated protein 12 (Cas12). Cas12 has been shown to indiscriminately cleave single-stranded deoxyribonucleic acid (ssDNA) upon RNA-guided DNA binding. As such, in one implementation of the assay, Cas12 is utilized when the target nucleic acid 28 is DNA, such as when testing the sample 20 for the presence of a target DNA taggant, bacteria, parasites, fungi, protozoa, helminths, DNA viruses, and the like. It will be appreciated that the sample 20 may be a swab taken from a commercial product, such as a high-value item, currency, food or agricultural products, potential counterfeit goods, or the like to determine an authenticity, identity, or other information embedded in the object via a nucleic acid taggant. Additionally or alternatively, the sample 20 may be a biological sample, such as a soil sample, a water sample, or another suitable type of material in the environment. In another implementation, Cas12 may be used in the assay 100 when the target nucleic acid 28 is DNA purified from a subject, such as a human or animal that is being tested for the presence or absence of a particular gene.

Alternatively, the nucleotide-targeting enzyme 14 may be, for example, a CRISPR-associated protein 13 (Cas13). Cas13 has been shown to cleave RNA upon RNA-guided RNA binding. As such, Cas13 may be used in the assay 100 when the target nucleic acid 100 is RNA, such as when the sample 20 is being tested for the presence of RNA viruses.

Figure 2A:
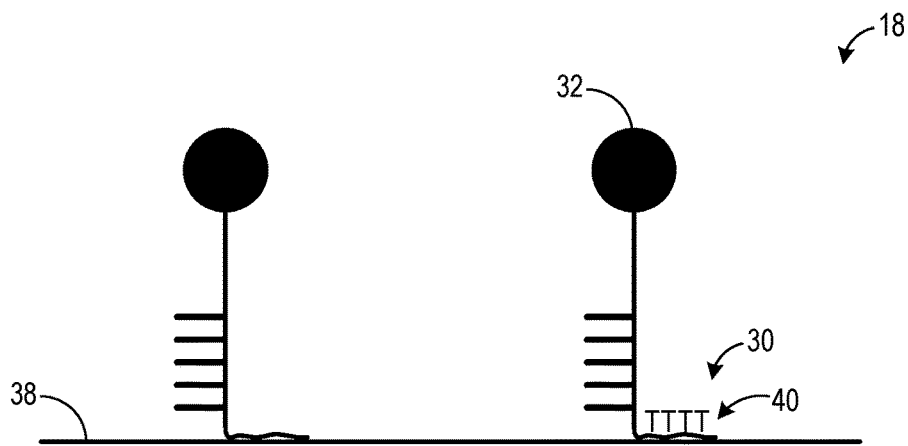
FIGS. 2A to 2C are illustrations of the quencher-labeled oligonucleotide and the fluorophore-labeled oligonucleotide of the multiplex assay of FIG. 1.
Figure 2B:
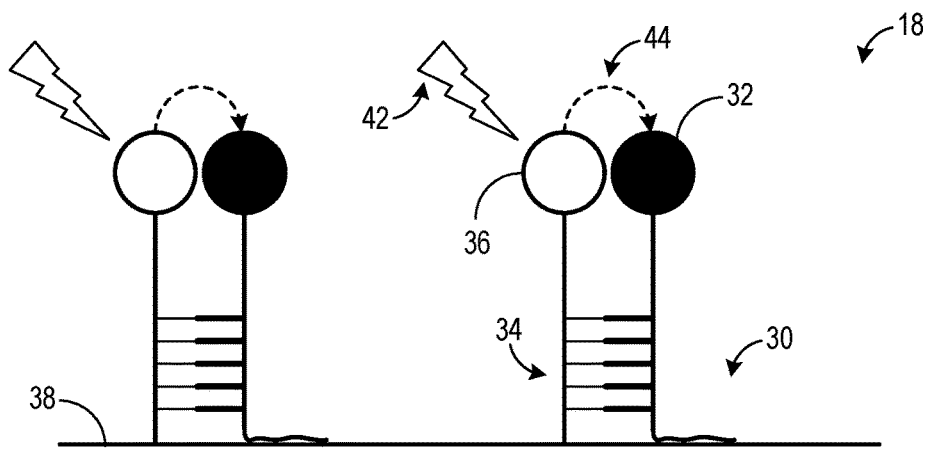
Figure 2C:
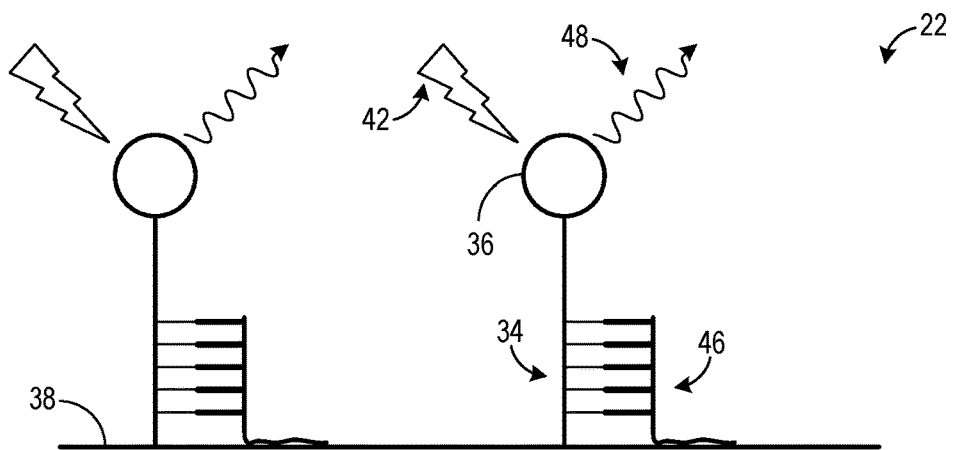

Turning to FIGS. 2A to 2C the quencher-labeled oligonucleotide 18 and the fluorophore-labeled oligonucleotide 22 of the multiplex assay 100 are illustrated. The quencher 32 and fluorophore 36 may be configured as dyes such that energy transfer from the fluorophore 36, i.e. donor, to the quencher, i.e., acceptor, may occur without absorption or emission of photons. As discussed above and shown in FIG. 2A, the quencher-labeled oligonucleotide 18 may have an anchor portion 30 configured to bind to the substrate 10. The substrate 10 may be a nitrocellulose membrane 38, as it is widely used for immobilizing nucleic acids. The anchor portion 30 may be designed to be a poly-thymine ((poly)T) tail 40 at the 5' end of the quencher-labeled oligonucleotide 18 that binds to the nitrocellulose membrane 38. However, it will be appreciated that the quencher-labeled oligonucleotide 18 may form a stable interaction with the nitrocellulose membrane 38 via a different mechanism, such as modifying an end of the quencher-labeled oligonucleotide 18 with biotin such that it can form a strong bond with streptavidin-coated nitrocellulose membrane, for example. Additionally or alternatively, the substrate may be an eggshell membrane (ESM), for example. It has been demonstrated that ESM treated with acetic acid or n-butyl acetate can be used to immobilize nucleic acids having terminal amine groups. Other substrates, such as nylon membranes, nanofibers, chitosan-modified membranes, for example, may be used to bind and retain nucleic acids in the multiplex assay described herein.

As shown in FIGS. 2B and 2C, the fluorophore-labeled oligonucleotide 22 may have a sequence 34 at least partly complementary to a sequence of the quencher-labeled oligonucleotide 18, and a fluorophore 36 configured to emit light upon excitation in the absence of the quencher 32. When the fluorophore-labeled oligonucleotide 22 is added to the assay, it binds to the quencher-labeled oligonucleotide 18 via the sequence 34 that is at least partly complementary to a sequence of the quencher-labeled oligonucleotide 18. It will be appreciated that the sequence 34 of the fluorophore-labeled oligonucleotide 22 may be designed to be complementary to a region of the quencher-labeled oligonucleotide 18 near the anchor portion 30.

In the absence of the target nucleic acid 28 in the sample 20, the spacer sequence 26 of the gRNA 16 remains unbound to another nucleic acid, and the nucleotide-targeting enzyme 14 is not activated. Under these conditions, the quencher-labeled oligonucleotide 18 is not cleaved by the nucleotide-targeting enzyme 14, and the quencher 32 remains in close proximity to the fluorophore 36, as shown in FIG. 2B. Thus, when the fluorophore 36 is excited by exposure to light 42 of a predetermined wavelength, energy 44 is transferred from the fluorophore 36 to the adjacent quencher 32 via Förster or fluorescence resonance energy transfer (FRET) rather than being detected as an emission of light from the fluorophore 36.

When the target nucleic acid 28 is present in the sample 20, the spacer sequence 26 of the gRNA 16 binds the complementary sequence of the target nucleic acid 28 and guides the nucleotide-targeting enzyme 14 to the target nucleic acid 28, thereby activating the nucleotide-targeting enzyme 14 to cleave nucleic acids, including the quencher-labeled oligonucleotide 18. Cleavage of the quencher-labeled oligonucleotide 18 results in a truncated quencher-labeled oligonucleotide 46 that lacks the quencher 32. However, the fluorophore-labeled oligonucleotide 22 may bind the truncated quencher-labeled oligonucleotide 46 via the sequence 34 of the fluorophore-labeled oligonucleotide 22 that is complementary to a region of the quencher-labeled oligonucleotide 18 near the anchor portion 30, as shown in FIG. 2C. When the fluorophore 36 is excited by exposure to light 42 of a predetermined wavelength in the absence of the quencher 32, its fluorescence can be detected as an emission of light 48 at a predetermined wavelength. It will be appreciated that light described herein to which the fluorophore 36 is exposed may be ultraviolet (UV) light, light from a light-emitting diode (LED), or another type of light suitable for excitation of the fluorescent dye. It is preferable that the light source be portable, and it is more preferable that the light source be configured as a hand-held light device.

As discussed above, Cas12 has been shown to indiscriminately cleave ssDNA upon RNA-guided DNA binding, and Cas13 has been shown to cleave RNA upon RNA-guided RNA binding. As such, when the target nucleic acid 28 is DNA, the quencher-labeled oligonucleotide 18 may be synthesized as an ssDNA molecule such that it is cleaved by Cas12. Accordingly, the fluorophore-labeled oligonucleotide 22 may be synthesized as an RNA molecule such that it is not cleaved by Cas12. Likewise, when the target nucleic acid 28 is RNA, the quencher-labeled oligonucleotide 18 may be synthesized as an RNA molecule such that it is cleaved by Cas13. Accordingly, the fluorophore-labeled oligonucleotide 22 may be synthesized as a DNA molecule such that it is not cleaved by Cas13.

Figure 3A:
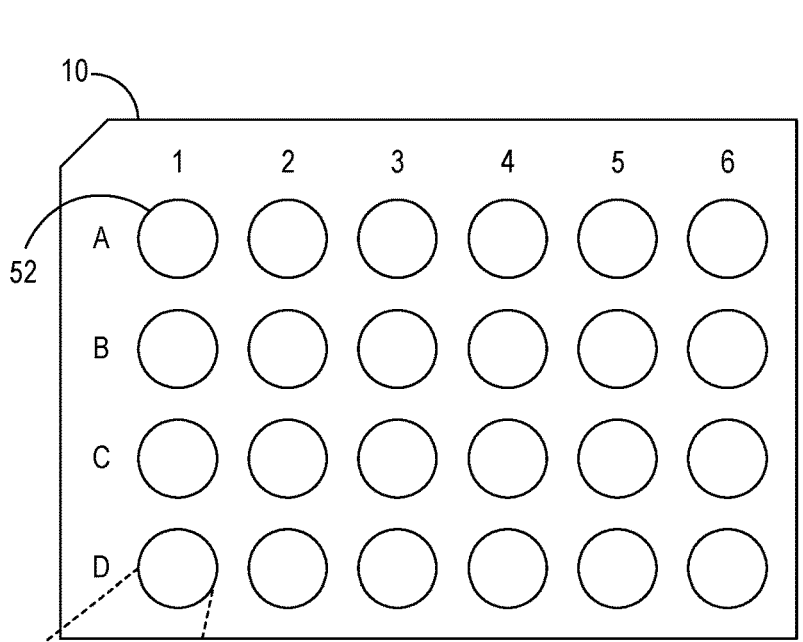
FIGS. 3A and 3B are illustrations of example embodiments of the multiplex assay of FIG. 1.
Figure 3A:
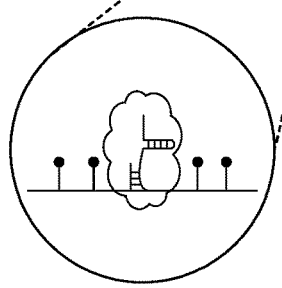
Figure 3B:
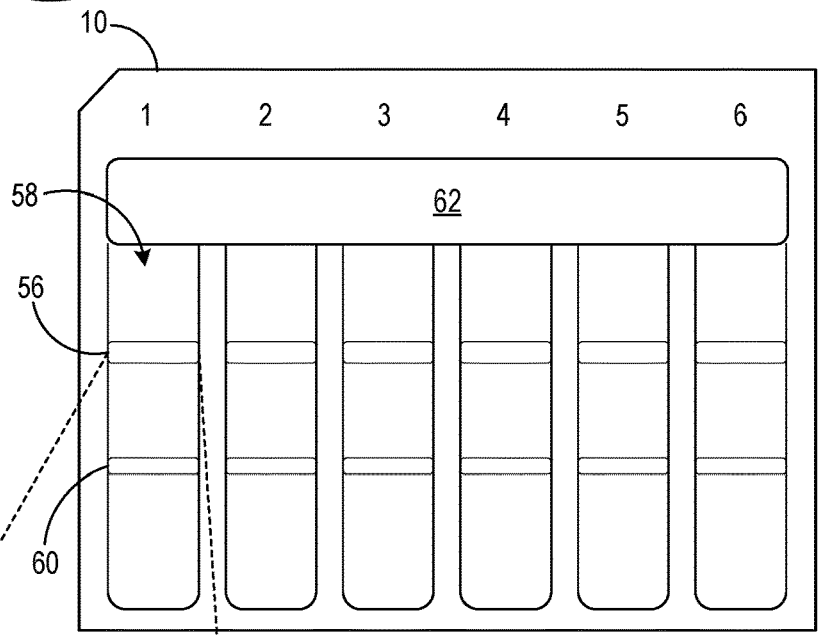
Figure 3B:
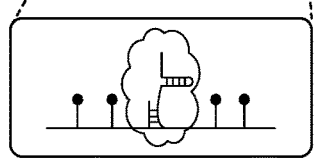

FIGS. 3A and 3B show example embodiments of the multiplex assay 100. As illustrated, in any configuration of the assay 100, a notch or the like may be formed in a corner of the substrate 10 for the purpose of orientation. As shown in FIG. 3A, the assay 100 may be configured as a spot assay 50. In the spot assay 50, each assay location 12 may be defined as an individual well 52, i.e. spot, on the substrate 10. The nucleotide-targeting enzyme 14, the gRNA 16, and the quencher-labeled oligonucleotide 18 are added to each individual well 52, as depicted in the enlarged illustration of the individual well 52 in FIG. 3A. To deposit like amounts of the components precisely and reproducibly at each individual well 52, the nucleotide-targeting enzyme 14, the gRNA 16, and the quencher-labeled oligonucleotide 18 may be deposited, i.e., printed, on the substrate 10 using an inkjet printer or the like. Alternatively, the nucleotide-targeting enzyme 14, the gRNA 16, and the quencher-labeled oligonucleotide 18 may be deposited using a micropipette or another suitable instrument capable of accurately transferring precise quantities of the components. When the spot assay 50 is ready to be used, equal portions, i.e., aliquots, of the sample 20 may be spotted onto the substrate 10 at each assay location. While the example spot assay 50 illustrated in FIG. 3A has 24 individual wells 52, it will be appreciated that the spot assay 50 may be configured to have any suitable number of individual wells 52.

Alternatively, the assay 100 may be configured as a lateral flow assay 54, as shown in FIG. 3B. In the lateral flow assay 54, each assay location 12 may be defined as test strip 56 in a lane 58 on the substrate 10. The nucleotide-targeting enzyme 14, the gRNA 16, and the quencher-labeled oligonucleotide 18 are added to each test strip 56, as depicted in the enlarged illustration of the test strip 56 in FIG. 3B. The lateral flow assay 54 may additionally include a control strip 60 in each lane 58 that serves to validate the lateral flow assay 54. As described above, the nucleotide-targeting enzyme 14, the gRNA 16, and the quencher-labeled oligonucleotide 18 may be printed on the substrate 10 with an inkjet printer or deposited with an instrument such as a micropipette. When the lateral flow assay 54 is ready to be used, a single volume of the sample 20 is applied to the substrate 10 at a sample location 62 located at one end of each lane 58. The sample 20 then flows along the substrate 10 in each lane 58 via capillary action. While the example lateral flow assay 54 illustrated in FIG. 3B has six test strips 56 and lanes 58, it will be appreciated that the lateral flow assay 54 may be configured to have any suitable number of test strips 56 and lanes 58.

Regardless of the format of the assay 100, each assay location 12 of the plurality of assay locations may have a unique gRNA sequence that is configured to be complementary to a nucleic acid sequence of a unique target nucleic acid, such as a nucleic acid of a specific microorganism. Configured as such, a single assay 100 can be utilized to detect the presence of several predetermined microorganisms in the sample 20, such as soil, water, or another organic material found in the environment. Additionally or alternatively, as described above, the assay 100 may be configured to detect DNA purified from a subject, such as a human or animal that is being tested for the presence or absence of a particular gene. It will be appreciated that the potential analytes provided above serve as exemplary applications of the assay 100 and are in no way meant to limit the scope of analytes that could be detected using the multiplex assay 100 described herein.

Figure 4A:
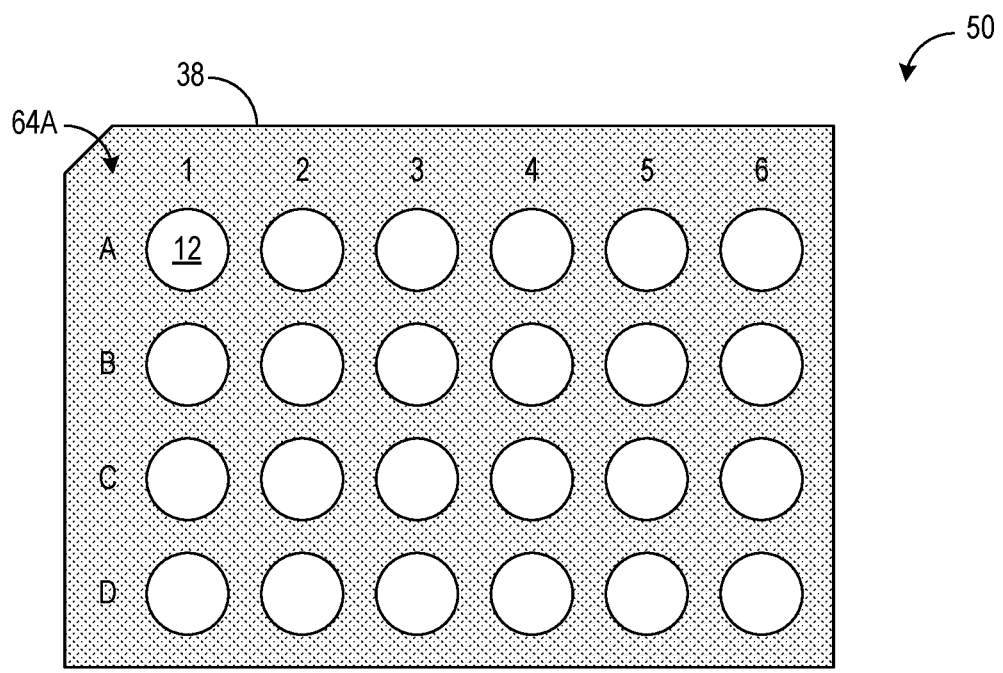
FIGS. 4A and 4B are illustrations of physically separated assay locations on a substrate of the multiplex assay of FIG. 1.
Figure 4B:
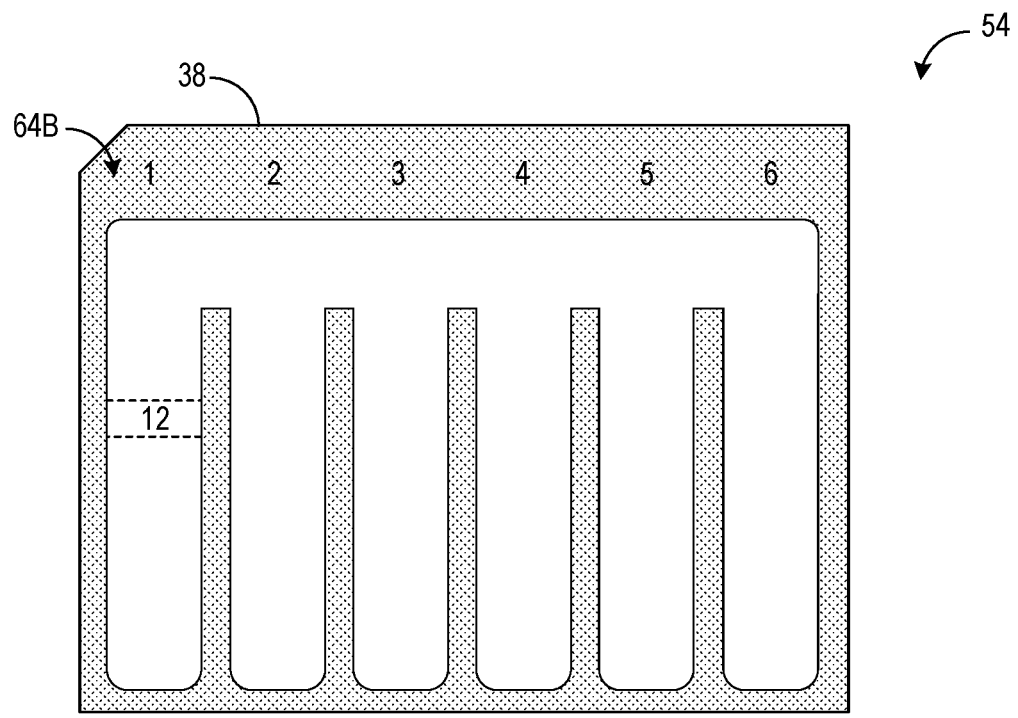

As described above and shown in the figures, the plurality of assay locations 12 on the substrate 10 are physically separated from one another. In one implementation, the physical separation of the assay locations 12 is achieved via depositing a pattern 64 of barriers on the substrate. Specifically, when the substrate 10 is configured as a nitrocellulose membrane 38, a wax-based printer may be used to deposit wax to form the pattern 64 of barriers. When the wax is heated, it permeates the nitrocellulose membrane 38, thereby forming hydrophobic barriers to physically separate the assay locations 12 from one another, as depicted by the shaded portions of FIGS. 4A and 4B. An example of a pattern 64A of barriers when the assay 100 is configured as the spot assay 50 is shown in FIG. 4A. FIG. 4B illustrates an example pattern 64B of barriers when the assay 100 is configured as the lateral flow assay 54. It will be appreciated that FIGS. 4A and 4B provide examples of the pattern 64 of barriers, and the pattern 64 may be configured in any number of patterns suitable for use with the assay 100. It will be further appreciated that forming hydrophobic barriers from wax is merely one method of physically separating the assay locations 12, and is not meant to limit the scope of how the physical separation is achieved.

Figure 5A:
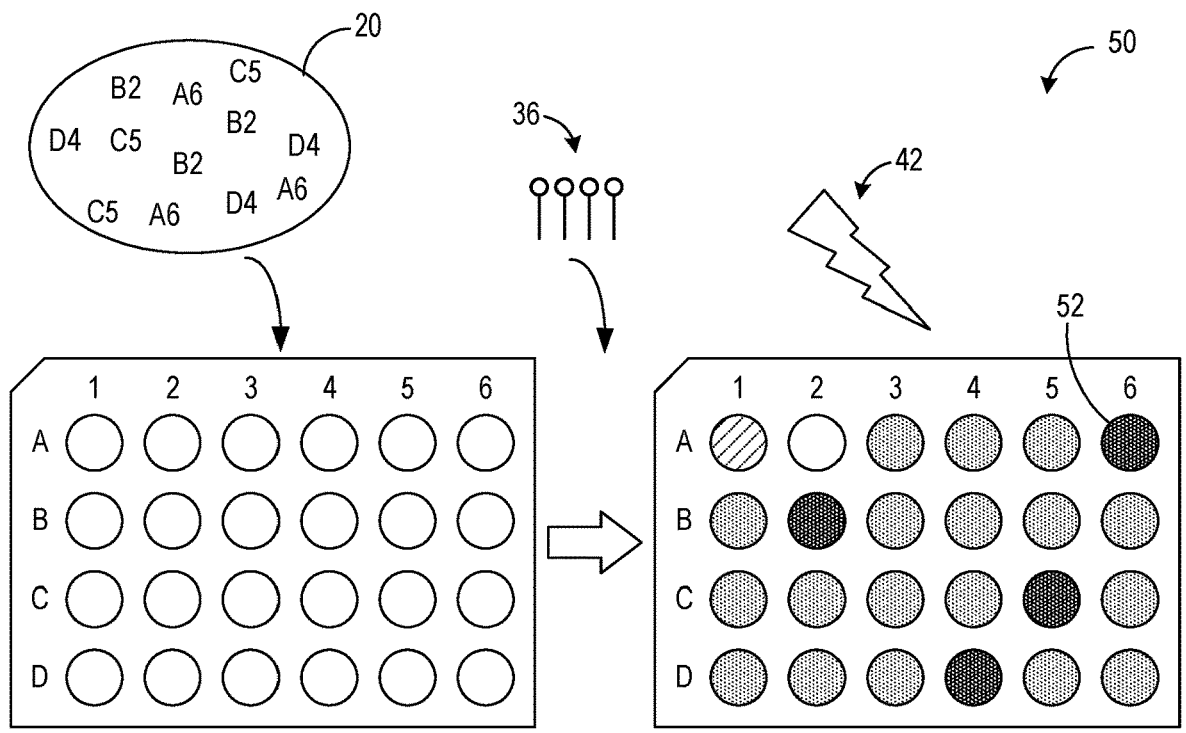
FIGS. 5A and 5B are illustrations showing results of the multiplex assay of FIG. 1.
Figure 5B:
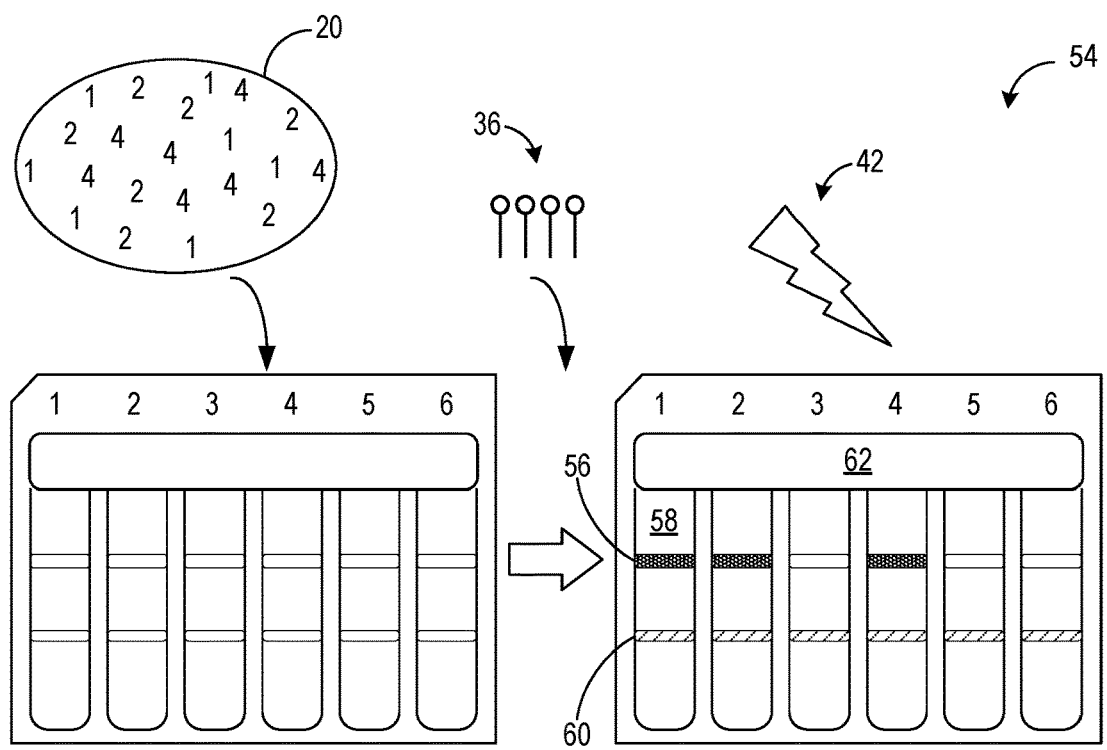

FIGS. 5A and 5B illustrate the addition of the sample 20 to the assay 100, and how the results of the assay 100 may look upon exposure to a light source that excites the fluorophores 36. When the assay 100 is utilized to detect a target nucleic acid taggant, a swab from the sample 20 may be agitated in a buffer solution via a vortex agitator, for example, to release the target nucleic acid 28 from the swab. Additionally or alternatively, when the assay 100 is utilized to detect the presence of bacteria, parasites, fungi, protozoa, helminths, viruses, and the like in a biological sample, the sample 20 may be subjected to sonication to release the target nucleic acid 28 from microorganisms contained in the sample 20. As sonication can be easily performed with a probe that emits sound waves, the sample 20 can be prepared for use with the assay 100 at any number of locations, including a site at or near where the sample 20 was collected. Alternatively, the sample 20 may be subjected to mechanical disruption to release the target nucleic acid 28 from microorganisms contained in the biological sample. The mechanical disruption may be performed by agitating the sample 20 in the presence of beads or balls. As with sonication, mechanical disruption of the sample 20 can be achieved with a portable device, such as a homogenizer, thereby enabling preparation of the sample 20 for use with the assay 100 at any number of locations.

In the example shown in FIG. 5A, the assay 100 is configured as the spot assay 50. The sample 20 is depicted as containing target nucleic acids after homogenization. For the sake of simplicity, the target nucleic acids contained in the sample are indicated by "A6," "B2," "C5," and "D4," which correspond to the individual wells 52 that each have a gRNA sequence that is complementary to one of the target nucleic acids contained in the sample. As described in detail above, the nucleotide-targeting enzyme 14, the gRNA 16, and the quencher-labeled oligonucleotide 18 are added to each individual well 52, and a portion of the sample 20 is subsequently added to each individual well 52 when the spot assay 50 is used. When a target nucleic acid 28 is recognized by the spacer sequence 26 of the gRNA 16 in an individual well, the nucleotide-targeting enzyme 14 is activated to cleave nucleic acids, including the quencher-labeled oligonucleotide 18. Cleavage of the quencher-labeled oligonucleotide 18 results in a truncated quencher-labeled oligonucleotide 46 that lacks the quencher 32. The presence of the target nucleic acid 28 can be detected by a fluorescence pattern of the spot assay 50 after addition and excitation of the fluorophore 36. In the example shown in FIG. 5A, the individual wells corresponding to A6, B2, C5, and D4 have a darker shading than other individual wells, thereby indicating fluorescence and thus the presence of four different target nucleic acids 28 in the sample 20. As shown, many of the other individual wells may have low levels of fluorescence due to incomplete quenching. As such, it may be desirable to have positive and negative controls in the spot assay 50. For the positive control, a nucleic acid known to be complementary to a specific gRNA in one individual well in the spot assay 50 may be added to that individual well instead of the sample 20. As shown in FIG. 5A, the positive control is indicated by the individual well corresponding to A1. For the negative control, one individual well may be prepared without gRNA, and will thus have no fluorescence, as indicated by the individual well corresponding to A2.

In the example shown in FIG. 5B, the assay 100 is configured as the lateral flow assay 54. The sample 20 is depicted as containing target nucleic acids after homogenization. Similar to the example shown in FIG. 5A, the target nucleic acids contained in the sample 20 are indicated by numbers that correspond to the lanes 58 that include test strips 56 having a gRNA sequence that is complementary to one of the target nucleic acids contained in the sample 20. As described in detail above, the nucleotide-targeting enzyme 14, the gRNA 16, and the quencher-labeled oligonucleotide 18 are added to each test strip 56, and a single volume of the sample 20 is applied to the substrate 10 at a sample location 62 located at one end of each lane 58 when the lateral flow assay 54 is used. The sample 20 then flows along the substrate 10 in each lane 58 via capillary action. When a target nucleic acid 28 is recognized by the spacer sequence 26 of the gRNA 16 in a test strip, the interaction can be detected after subsequent addition of the fluorophore 36 via the mechanisms described in detail above. As shown in FIG. 5B, the test strips in lanes corresponding to 1, 2, and 4 have a darker shading than other test strips, thereby indicating fluorescence and thus the presence of three different target nucleic acids 28 in the sample 20. As described above, the lateral flow assay 54 may additionally include a control strip 60 in each lane 58 that may exhibit fluorescence or a colorimetric change to validate the lateral flow assay 54. The control strips 60 may be located further down the lanes 58 than the test strips 56, thereby indicating whether the sample 20 flowed past the test strips 56.

Figure 6:
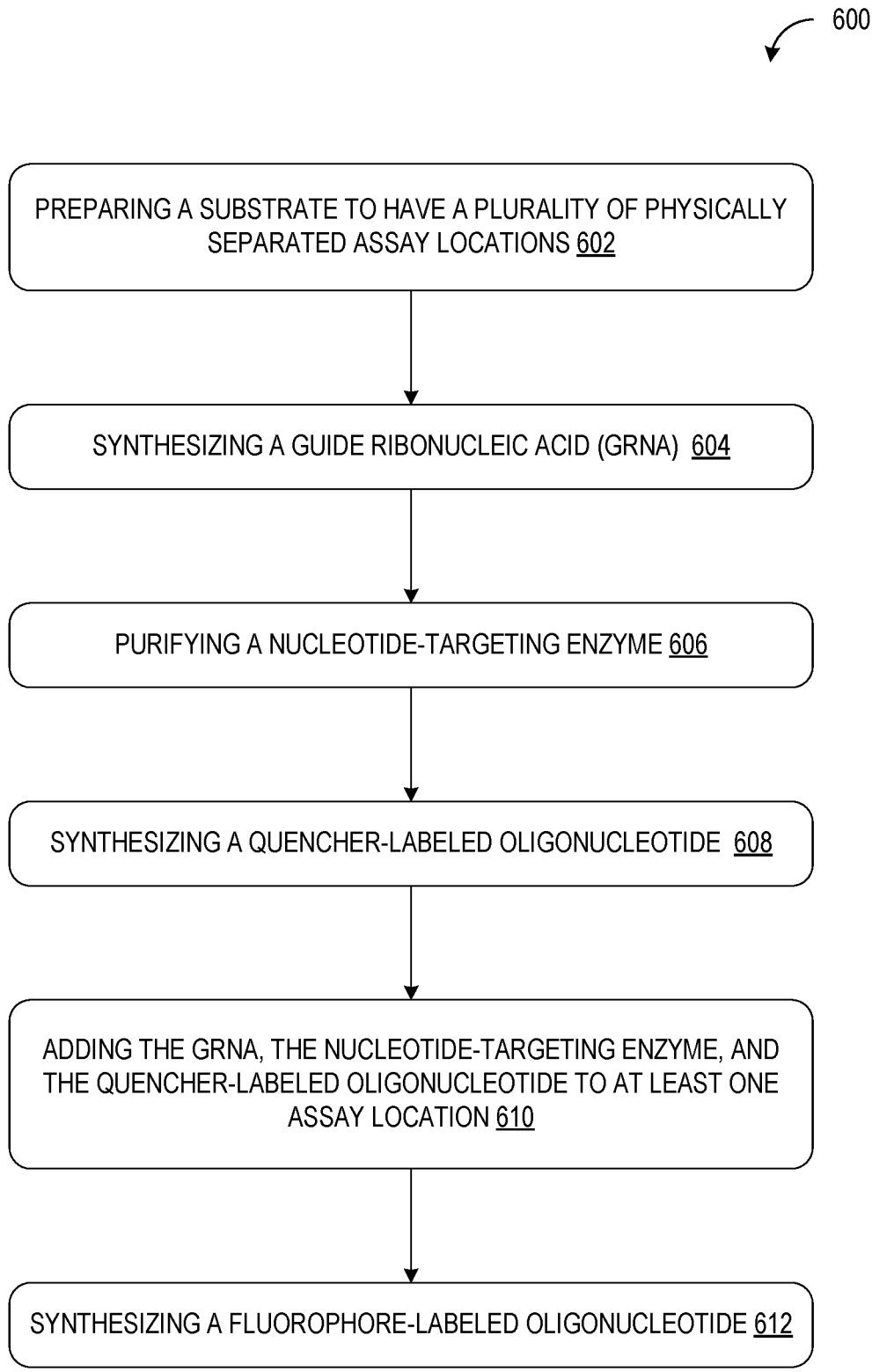
FIG. 6 is a flowchart of a method for manufacturing a multiplex assay for nucleic acid detection according to one example configuration of the present disclosure.

FIG. 6 is a flowchart of a method for manufacturing a multiplex assay for nucleic acid detection according to one example configuration of the present disclosure. At step 602, the method 600 may include preparing a substrate to have a plurality of physically separated assay locations. As described above, when the substrate is a nitrocellulose membrane, the physically separated assay locations may be formed by depositing a pattern of hydrophobic barriers on the nitrocellulose membrane with a wax-based printer.

Continuing from step 602 to step 604, the method 600 may include synthesizing a guide ribonucleic acid (gRNA). The gRNA may be designed to have a sequence complementary to a sequence of a target nucleic acid.

Proceeding from step 604 to step 606, the method 600 may include purifying a nucleotide-targeting enzyme. The nucleotide-targeting enzyme may be configured to cleave nucleic acids upon activation.

Advancing from step 606 to step 608, the method 200 may include synthesizing a quencher-labeled oligonucleotide. The quencher-labeled oligonucleotide may be designed to have an anchor portion and a quencher. The anchor portion may be configured to bind to the substrate, and the quencher may be configured to absorb energy emitted by an adjacent fluorophore.

Continuing from step 608 to step 610, the method 200 may include adding the gRNA, nucleotide-targeting enzyme complex, and quencher-labeled oligonucleotide to at least one assay location of the plurality of assay locations. As describe above, the nucleotide-targeting enzyme, the gRNA, and the quencher-labeled oligonucleotide may be deposited on the substrate using an inkjet printer or the like. Alternatively, the nucleotide-targeting enzyme, the gRNA, and the quencher-labeled oligonucleotide may be deposited using a micropipette or another suitable instrument capable of accurately transferring precise quantities of the components.

Proceeding from step 610 to step 612, the method 200 may include synthesizing a fluorophore-labeled oligonucleotide. The fluorophore-labeled oligonucleotide may be added to each assay location of the plurality of assay locations subsequent to the addition of a sample. As described above, the fluorophore-labeled oligonucleotide may have a sequence at least partly complementary to a sequence of the quencher-labeled oligonucleotide. The fluorophore-labeled oligonucleotide may also include a fluorophore molecule configured to emit light upon excitation in the absence of the quencher molecule.

The embodiments described above may be used to achieve rapid, accurate results when testing for the presence of a variety of analytes in a single multiplexed assay. Further, they can advantageously be used to test samples for multiple analytes without requiring preparation of the assay immediately beforehand, thereby improving the efficiency of conducting such an analysis and negating the need for performing multiple individual assays. Additionally, since the embodiments described herein are designed to detect nucleic acids without the need for amplification, sample preparation can be greatly simplified, and analysis time can be reduced. Further, the ability to detect results of the assay quickly and easily with a hand-held light device enables a user to perform the assay from start to finish at the site of sample collection. For these reasons, the multiplex assay embodiments described herein offer the ability to quickly and accurately detect and/or quantify the presence of multiple analytes at one time without the requirement for large equipment and laboratory space.

The following paragraphs provide additional description of aspects of the present disclosure. One aspect provides a multiplex assay for nucleic acid detection. The assay may comprise a substrate and a sample. The substrate may have a plurality of physically separated assay locations, and each assay location of the plurality of assay locations may include a nucleotide-targeting enzyme, a guide ribonucleic acid (gRNA), and a quencher-labeled oligonucleotide. The nucleotide-targeting enzyme may cleave nucleic acids. The guide ribonucleic acid (gRNA) may form a complex with the nucleotide-targeting enzyme, and a sequence of the gRNA may be complementary to a sequence of a target nucleic acid. The quencher-labeled oligonucleotide may have an anchor portion configured to bind to the substrate, and a quencher configured to absorb energy emitted by an adjacent fluorophore. A portion of the sample may be distributed to each assay location of the plurality of assay locations. The gRNA may be configured to recognize the target nucleic acid in the sample, guide the nucleotide-targeting enzyme to the target nucleic acid, and activate the nucleotide-targeting enzyme to cleave nucleic acids, including the quencher-labeled oligonucleotide. The assay may further include a fluorophore-labeled oligonucleotide that is added to each assay location of the plurality of assay locations subsequent to a distribution of the sample. The fluorophore-labeled oligonucleotide may have a sequence at least partly complementary to a sequence of the quencher-labeled oligonucleotide, and a fluorophore configured to emit light upon excitation in the absence of the quencher. A user may identify a presence of the target nucleic acid in the sample via detection of unquenched light emitted by the fluorophore at one or more assay locations of the plurality of assay locations.

In this aspect, additionally or alternatively, each assay location of the plurality of assay locations may have a unique gRNA sequence that is configured to be complementary to a nucleic acid sequence of a specific microorganism. In this aspect, additionally or alternatively, the nucleotide-targeting enzyme, the gRNA, and the quencher-labeled oligonucleotide may be deposited on the substrate at each assay location of the plurality of assay locations.

In this aspect, additionally or alternatively, the nucleotide-targeting enzyme may be a clustered regularly interspaced short palindromic repeats (CRISPR)-associated protein 12 (Cas12), and the target nucleic acid may be deoxyribonucleic acid. In this aspect, additionally or alternatively, the nucleotide-targeting enzyme may be a clustered regularly interspaced short palindromic repeats (CRISPR)-associated protein 13 (Cas13), and the target nucleic acid may be ribonucleic acid.

In this aspect, additionally or alternatively, the substrate may be a nitrocellulose membrane, and the anchor portion of the quencher-labeled oligonucleotide may be a poly-thymine tail at the 5' end of the quencher-labeled oligonucleotide that binds to the nitrocellulose membrane. In this aspect, additionally or alternatively, physical separation of the assay locations may be achieved via depositing a pattern of hydrophobic barriers on the nitrocellulose membrane with a wax-based printer.

In this aspect, additionally or alternatively, the assay may be a spot assay in which each assay location is defined as an individual well on the substrate, and the sample may be spotted onto the substrate at each assay location. In this aspect, additionally or alternatively, the assay may be a lateral flow assay in which each assay location is defined as a lane on the substrate, and the sample may be applied to the substrate at one end of the lane and flows along the substrate via capillary action.

In this aspect, additionally or alternatively, the sample may be a swab containing a nucleic acid taggant. In this aspect, additionally or alternatively, the sample may be a biological sample containing one or more microorganisms.

Another aspect provides a method for manufacturing a multiplex assay for nucleic acid detection. The method may comprise preparing a substrate to have a plurality of physically separated assay locations. The method may further comprise purifying a nucleotide-targeting enzyme that cleaves nucleic acids. The method may further comprise synthesizing a guide ribonucleic acid (gRNA) to have a sequence complementary to a sequence of a target nucleic acid. The method may further comprise forming a complex of the nucleotide-targeting enzyme and the gRNA. The method may further comprise synthesizing a quencher-labeled oligonucleotide to have an anchor portion configured to bind to the substrate, and a quencher configured to absorb energy emitted by an adjacent fluorophore. The method may further comprise adding the gRNA, the nucleotide-targeting enzyme complex, and the quencher-labeled oligonucleotide to at least one assay location of the plurality of assay locations. The method may further comprise synthesizing a fluorophore-labeled oligonucleotide to be added to each assay location of the plurality of assay locations subsequent to addition of a sample. The fluorophore-labeled oligonucleotide may have a sequence at least partly complementary to a sequence of the quencher-labeled oligonucleotide, and a fluorophore configured to emit light upon excitation in the absence of the quencher. The gRNA may be configured to recognize the target nucleic acid in the sample, guide the nucleotide-targeting enzyme to the target nucleic acid, and activate the nucleotide-targeting enzyme to cleave nucleic acids, including the quencher-labeled oligonucleotide. Upon subsequent addition of the fluorophore-labeled oligonucleotide to each assay location of the plurality of assay locations, a user may determine a presence of the target nucleic acid in the sample via detection of unquenched light emitted by the fluorophore at one or more assay locations of the plurality of assay locations.

In this aspect, additionally or alternatively, the method may further comprise synthesizing a plurality of gRNAs, each gRNA having a unique sequence that is configured to be complementary to a nucleic acid sequence of a specific microorganism, and preparing the assay such that each assay location of the plurality of assay locations has a gRNA with a unique sequence.

In this aspect, additionally or alternatively, the method may further comprise depositing the gRNA, nucleotide-targeting enzyme complex, and quencher-labeled oligonucleotide on the substrate at each assay location of the plurality of assay locations.

In this aspect, additionally or alternatively, the nucleotide-targeting enzyme may be a clustered regularly interspaced short palindromic repeats (CRISPR)-associated protein 12 (Cas12), and the target nucleic acid may be deoxyribonucleic acid. In this aspect, additionally or alternatively, the nucleotide-targeting enzyme may be a clustered regularly interspaced short palindromic repeats (CRISPR)-associated protein 13 (Cas13), and the target nucleic acid may be ribonucleic acid.

In this aspect, additionally or alternatively, the method may further comprise using a nitrocellulose membrane as the substrate, and synthesizing the anchor portion of the quencher-labeled oligonucleotide to be a poly-thymine tail at the 5' end of the quencher-labeled oligonucleotide that binds to the nitrocellulose membrane. In this aspect, additionally or alternatively, the method may further comprise depositing a pattern of hydrophobic barriers on the nitrocellulose membrane with a wax-based printer to achieve physical separation of the assay locations.

In this aspect, additionally or alternatively, the method may further comprise designing the assay as a spot assay in which each assay location is defined as an individual well on the substrate that is configured to have a portion of the sample spotted thereupon.

Another aspect provides a multiplex assay for nucleic acid detection. The assay may comprise a nitrocellulose membrane and a sample. The nitrocellulose membrane may have a plurality of physically separated assay locations, and each assay location of the plurality of assay locations may include a nucleotide-targeting enzyme, a guide ribonucleic acid (gRNA), and a quencher-labeled oligonucleotide. The nucleotide-targeting enzyme may cleave nucleic acids. The guide ribonucleic acid (gRNA) may form a complex with the nucleotide-targeting enzyme, and a sequence of the gRNA may be complementary to a sequence of a target nucleic acid. The quencher-labeled oligonucleotide may have an anchor portion configured to bind to the nitrocellulose membrane, and a quencher configured to absorb energy emitted by an adjacent fluorophore. A portion of the sample may be distributed to each assay location of the plurality of assay locations. Physical separation of the assay locations may be achieved via depositing a pattern of hydrophobic barriers on the nitrocellulose membrane with a wax-based printer. The nucleotide-targeting enzyme, the gRNA, and the quencher-labeled oligonucleotide may be deposited on the nitrocellulose membrane at each assay location of the plurality of assay locations with an ink-jet printer, thereby allowing the assay to be stored for later use prior to a distribution of the sample. Upon distribution of the sample to each assay location of the plurality of assay locations, the gRNA may be configured to recognize the target nucleic acid in the sample, guide the nucleotide-targeting enzyme to the target nucleic acid, and activate the nucleotide-targeting enzyme to cleave nucleic acids, including the quencher-labeled oligonucleotide. The assay may further include a fluorophore-labeled oligonucleotide that is added to each assay location of the plurality of assay locations subsequent to a distribution of the sample. The fluorophore-labeled oligonucleotide may have a sequence at least partly complementary to a sequence of the quencher-labeled oligonucleotide, and a fluorophore configured to emit light upon excitation in the absence of the quencher. A user may identify a presence of the target nucleic acid in the sample via detection of unquenched light emitted by the fluorophore at one or more assay locations of the plurality of assay locations.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A multiplex assay system for deoxyribonucleic acid (DNA) detection, the assay comprising:
   a substrate having a plurality of physically separated assay locations, each assay location of the plurality of assay locations including:
      a clustered regularly interspaced short palindromic repeats (CRISPR)-associated protein 12 (Cas12) enzyme that cleaves single-stranded deoxyribonucleic acid (ssDNA),
      a guide ribonucleic acid (gRNA) that forms a complex with the Cas12 enzyme, a sequence of the gRNA being complementary to a sequence of a target DNA, and
      a quencher-labeled oligonucleotide, the quencher-labeled oligonucleotide being an ssDNA molecule and having an anchor portion configured to bind to the substrate, and a quencher configured to absorb energy emitted by an adjacent fluorophore;
   a sample, a portion of which is distributed to each assay location of the plurality of assay locations; and
   a fluorophore-labeled oligonucleotide that is added to each assay location of the plurality of assay locations subsequent to a distribution of the sample, the fluorophore-labeled oligonucleotide being an RNA molecule and having a region configured to bind a non-anchor portion of the quencher-labeled oligonucleotide, and a fluorophore configured to emit light upon excitation in an absence of the quencher, wherein the gRNA is configured to recognize the target DNA in the sample, thereby guiding the Cas12 enzyme to the target DNA and activating the Cas12 enzyme to cleave ssDNA molecules, the quencher-labeled ssDNA molecule is configured to be cleaved by the activated Cas12 enzyme, thereby resulting in a truncated quencher-labeled ssDNA molecule that lacks the quencher when the target DNA is present in the sample, and the fluorophore-labeled RNA is configured to not be cleaved by the Cas12 enzyme, thereby permitting identification of the target DNA in the sample via detection of light emitted by the fluorophore at one or more assay locations upon excitation.

2. The multiplex assay system of claim 1, wherein each assay location of the plurality of assay locations has a unique gRNA sequence that is configured to be complementary to a DNA sequence of a specific microorganism.

3. The multiplex assay system of claim 1, wherein the Cas12 enzyme, the gRNA, and the quencher-labeled oligonucleotide are deposited on the substrate at each assay location of the plurality of assay locations.

4. The multiplex assay system of claim 1, wherein the substrate is a nitrocellulose membrane, and the anchor portion of the quencher-labeled oligonucleotide is a poly-thymine tail at the 5' end of the quencher-labeled oligonucleotide that binds to the nitrocellulose membrane.

5. The multiplex assay system of claim 4, wherein physical separation of the assay locations is achieved via depositing a pattern of hydrophobic barriers on the nitrocellulose membrane with a wax-based printer.

6. The multiplex assay system of claim 1, wherein the assay is a spot assay in which each assay location is defined as an individual well on the substrate, and the sample is spotted onto the substrate at each assay location.

7. The multiplex assay system of claim 1, wherein the assay is a lateral flow assay in which each assay location is defined as a lane on the substrate, and the sample is applied to the substrate at one end of the lane and flows along the substrate via capillary action.

8. The multiplex assay system of claim 1, wherein the sample is a swab containing a nucleic acid taggant.

9. The multiplex assay system of claim 1, wherein the sample is a biological sample containing one or more microorganisms.

10. The multiplex assay system of claim 4, wherein the Case12 enzyme, the gRNA, and the quencher-labeled oligonucleotide are deposited on the nitrocellulose membrane at each assay location of the plurality of assay locations with an ink-jet printer, thereby allowing the assay to be stored for later use prior to the distribution of the sample.

11. A multiplex assay system for ribonucleic acid (RNA) detection, the assay comprising:

a substrate having a plurality of physically separated assay locations, each assay location of the plurality of assay locations including:

a clustered regularly interspaced short palindromic repeats (CRISPR)-associated protein 13 (Cas13) enzyme that targets and cleaves ribonucleic acid (RNA), a guide ribonucleic acid (gRNA) that forms a complex with the Cas13 enzyme, a sequence of the gRNA being complementary to a sequence of a target RNA, and a quencher-labeled oligonucleotide, the quencher-labeled oligonucleotide being an RNA molecule and having an anchor portion configured to bind to the substrate, and a quencher configured to absorb energy emitted by an adjacent fluorophore;

a sample, a portion of which is distributed to each assay location of the plurality of assay locations; and a fluorophore-labeled oligonucleotide that is added to each assay location of the plurality of assay locations subsequent to a distribution of the sample, the fluorophore-labeled oligonucleotide being a deoxyribonucleic acid (DNA) molecule and having a region configured to bind a non-anchor portion of the quencher-labeled oligonucleotide, and a fluorophore configured to emit light upon excitation in an absence of the quencher, wherein the gRNA is configured to recognize the target RNA in the sample, thereby guiding the Cas13 enzyme to the target RNA and activating the Cas13 enzyme to cleave RNA molecules, the quencher-labeled RNA molecule is configured to be cleaved by the activated Cas13 enzyme, thereby resulting in a truncated quencher-labeled RNA molecule that lacks the quencher when the target RNA is present in the sample, and the fluorophore-labeled DNA molecule is configured to not be cleaved by the Cas13 enzyme, thereby permitting identification of the target RNA in the sample via detection of light emitted by the fluorophore at one or more assay locations upon excitation.

12. The multiplex assay system of claim 11, wherein each assay location of the plurality of assay locations has a unique gRNA sequence that is configured to be complementary to an RNA sequence of a specific microorganism.

13. The multiplex assay system of claim 11, wherein the Cas13 enzyme, the gRNA, and the quencher-labeled oligonucleotide are deposited on the substrate at each assay location of the plurality of assay locations.

14. The multiplex assay system of claim 11, wherein the substrate is a nitrocellulose membrane, and the anchor portion of the quencher-labeled oligonucleotide is a poly-thymine tail at the 5' end of the quencher-labeled oligonucleotide that binds to the nitrocellulose membrane.

15. The multiplex assay system of claim 14, wherein physical separation of the assay locations is achieved via depositing a pattern of hydrophobic barriers on the nitrocellulose membrane with a wax-based printer.

16. The multiplex assay system of claim 11, wherein the assay is a spot assay in which each assay location is defined as an individual well on the substrate, and the sample is spotted onto the substrate at each assay location.

17. The multiplex assay system of claim 11, wherein the assay is a lateral flow assay in which each assay location is defined as a lane on the substrate, and the sample is applied to the substrate at one end of the lane and flows along the substrate via capillary action.

18. The multiplex assay system of claim 11, wherein the sample is a swab containing a nucleic acid taggant.

19. The multiplex assay system of claim 11, wherein the sample is a biological sample containing one or more microorganisms.

20. The multiplex assay system of claim 14, wherein the Cas13 enzyme, the gRNA, and the quencher-labeled oligonucleotide are deposited on the nitrocellulose membrane at each assay location of the plurality of assay locations with an ink-jet printer, thereby allowing the assay to be stored for later use prior to the distribution of the sample.

* * * * *